United States Patent [19]
Willis

[11] Patent Number: 5,930,292
[45] Date of Patent: Jul. 27, 1999

[54] METHOD AND APPARATUS FOR IMPROVED AUTOCORRELATION IN BIPHASE MODULATED PSEUDORANDOM NOISE CODED SYSTEMS USING TRI-STATE DEMODULATION

[75] Inventor: Carl Myron Willis, Mesa, Ariz.

[73] Assignee: Motorola, Inc., Schaumburg, Ill.

[21] Appl. No.: 08/845,225

[22] Filed: Apr. 21, 1997

[51] Int. Cl.[6] .............................. H04B 15/00; H04K 1/00; H04L 27/30
[52] U.S. Cl. .......................... 375/208; 375/343; 342/145; 708/422
[58] Field of Search ...................... 375/280, 208, 375/209, 343, 316, 346; 342/189, 108, 145; 708/422, 425, 426, 424

[56] References Cited

U.S. PATENT DOCUMENTS

| | | | |
|---|---|---|---|
| 4,989,009 | 1/1991 | Zerkowitz | 342/145 |
| 5,247,586 | 9/1993 | Gobert et al. | 382/42 |
| 5,495,499 | 2/1996 | Fenton et al. | 375/205 |
| 5,497,160 | 3/1996 | Koehler et al. | 342/145 |
| 5,548,665 | 8/1996 | Gion et al. | 382/276 |
| 5,646,626 | 7/1997 | Willis | 342/189 |
| 5,646,627 | 7/1997 | Willis et al. | 342/189 |
| 5,684,727 | 11/1997 | Campbell et al. | 364/728.03 |
| 5,809,064 | 9/1998 | Fenton et al. | 375/208 |

*Primary Examiner*—Chi H. Pham
*Assistant Examiner*—Bryan Webster.
*Attorney, Agent, or Firm*—Bradley J. Botsch

[57] ABSTRACT

The present invention describes a method and apparatus for improving the autocorrelation performance in spread spectrum radar and communications systems by using a tri-state digital correlator to demodulate the received biphase modulated waveform. The tri-state correlator (100) includes a multiplexer (112) having a code input for receiving a tri-state code sequence, and three inputs each for receiving a sequence of data words including a first input for receiving a digitized signal data word, a second input for receiving an inverted digitized signal data word, and a third input for receiving a zero data word. The multiplexer includes an output and a means for producing a sequence of data words at the output, said means presenting at the output exactly one of the three data words appearing at either the first, second, or third input depending on which of the three code states appears at the code input. The present invention also describes the manner in which the tri-state code sequence is constructed from a binary code sequence to effect a significant improvement in the autocorrelation performance.

18 Claims, 6 Drawing Sheets

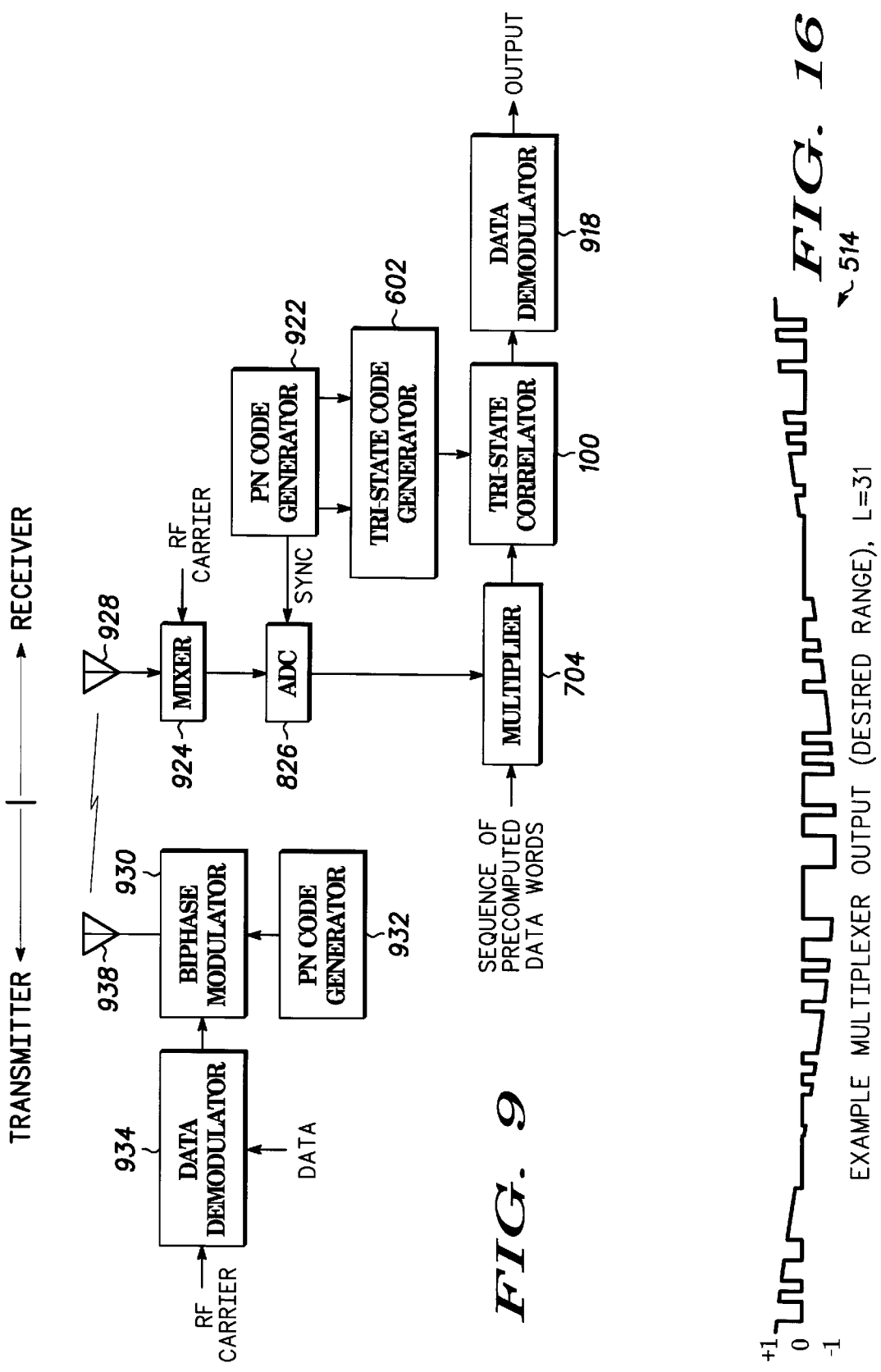

FIG. 10 ~304
EXAMPLE BINARY CODE SEQUENCE, L=31
FIG. 11 ~306
EXAMPLE DELAYED BINARY CODE SEQUENCE, L=31
FIG. 12 ~308
EXAMPLE TRI-STATE CODE SEQUENCE, L=31
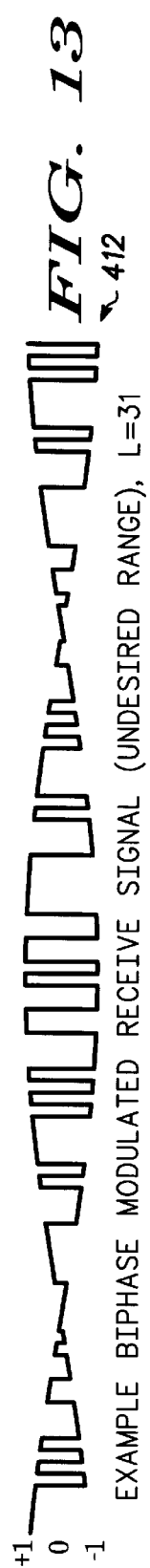
FIG. 13 ~412
EXAMPLE BIPHASE MODULATED RECEIVE SIGNAL (UNDESIRED RANGE), L=31
FIG. 14 ~414
EXAMPLE MULTIPLEXER OUTPUT (UNDESIRED RANGE), L=31
FIG. 15 ~512
EXAMPLE BIPHASE MODULATED RECEIVE SIGNAL (DESIRED RANGE), L=31

METHOD AND APPARATUS FOR IMPROVED AUTOCORRELATION IN BIPHASE MODULATED PSEUDORANDOM NOISE CODED SYSTEMS USING TRI-STATE DEMODULATION

FIELD OF THE INVENTION

This invention relates in general to the field of spread spectrum communications and radar systems and, in particular, to a method and apparatus for improved autocorrelation in biphase modulated pseudorandom noise coded systems using tri-state demodulation.

BACKGROUND OF THE INVENTION

In communications and radar systems, it is sometimes important to process signals having a desired range delay while rejecting signals having an undesired range delay. The out-of-range rejection (ORR) performance, synonymously referred to herein as the autocorrelation performance, is a measure of such a systems ability to accomplish this requirement. Pseudorandom Noise (PN) codes systems are often used to achieve acceptable ORR performance while maintaining low peak transmit power requirements. Such PN coded systems are classified as spread spectrum systems because of the signal bandwidth spreading effected by the PN encoding. Direct sequence multiple access modulation protocols such as the direct sequence Code Division Multiple Access (CDMA) protocol widely used in spread spectrum communications is an example of a communications system to which this invention may apply. PN coded radar systems in common use are examples of radar systems to which this invention may apply.

Most PN coded systems to which this invention apply modulate the PN code onto a carrier frequency prior to transmission, and subsequently demodulate the PN code in the receive path in a correlation process. Conventional pseudorandom noise (PN) systems use a biphase modulator to modulate the characteristics of a maximal length binary code sequence onto the continuously transmitted carrier frequency. The biphase modulator has two phase states which are nominally separated 180 degrees in phase, and which are selected in response to the two states of the binary code sequence. In such a conventional PN system, the ORR performance is limited, it being proportional to the square of the PN code length.

In designing a PN coded radar system there is a system tradeoff to be made between the various waveform parameters including: the PN code length, PN code chip width, Doppler frequency bandwidth, and transmitter center frequency. The PN code length establishes the system's ORR performance, the PN code chip width establishes the system's range resolution, the Doppler frequency bandwidth and the transmitter center frequency establish the maximum closing velocity. For a given range resolution, closing velocity and transmitter center frequency, the PN code length and consequently the ORR performance is limited. Thus, this system tradeoff often results in a compromise between conflicting system requirements.

In designing a PN coded communications system there is a similar system tradeoff to be made between these various waveform parameters. The PN code chip width establishes the system's range resolution for distinguishing signals from a desired range while rejecting signals from an unwanted range, and also establishes the transmission bandwidth. A longer PN code length is often desired to improve the ORR performance. However, for a given chip width, increasing the PN code length to improve the ORR performance will decrease the usable signal information bandwidth. In a direct sequence multiple access system, for example, the improved autocorrelation performance is desired because this decides how well the locally generated code signal can be synchronized and locked to the received signal. Also, improved autocorrelation performance enhances the ability of a direct sequence multiple access system to combat the effects of multipath interference and channel fading.

What is needed is a means for providing a significant improvement in the ORR performance while maintaining the same or shorter PN code length. This would provide greater flexibility in selecting the PN modulation waveform parameters, and would allow for the simultaneous improvement of other performance parameters.

In a spread spectrum PN radar system, for example, such a means would allow an increase in maximum target engagement velocity and/or an increase in the transmit frequency to permit improvements in antenna performance, while simultaneously improving the ORR performance. It would also provide a capability to detect very small targets in the presence of large out-of-range clutter return using a shorter PN code length.

In a spread spectrum communications system such a means would allow simultaneous improvements in signal information bandwidth and autocorrelation performance while maintaining the system range resolution and transmission bandwidth. This will enable performance improvements in the presence of multipath interference and channel fading, and also enable easier synchronization and locking of the received signal to the locally generated PN code generator.

BRIEF DESCRIPTION OF THE DRAWINGS

FIGS. 3 and 10–12 include tables and pictorial diagrams for illustrating how a tri-state code sequence may be generated as a function of binary and delayed binary code sequences;

FIGS. 4 and 12–14 include tables and pictorial diagrams for illustrating a range correlation process when the tri-state correlator of FIG. 1 is used to correlate a biphase modulated receive signal with an undesired range delay;

FIGS. 5 and 12, 15 and 16 include tables and pictorial diagrams for illustrating a range correlation process when the tri-state correlator of FIG. 1 is used to correlate a biphase modulated receive signal with a desired range delay;

FIG. 9 is a block diagram illustrating a spread spectrum communication system incorporating the tri-state correlator of FIG. 1.

DETAILED DESCRIPTION OF THE DRAWINGS

The present invention describes a method and apparatus for improving the ORR performance in spread spectrum radar and communications systems by using a tri-state digital correlator to demodulate the received biphase modulated waveform. The tri-state correlator includes a multiplexer having a code input for receiving a tri-state code sequence, and three inputs each for receiving a sequence of data words including a first input for receiving a digitized signal data word, a second input for receiving an inverted digitized signal data word, and a third input for receiving a zero data word. The multiplexer includes an output and a means for producing a sequence of data words at the output, said means presenting at the output exactly one of the three data words appearing at either the first, second, or third input depending on which of the three code states appears at the code input. The present invention also describes the manner in which the tri-state code sequence is constructed from a binary code sequence to effect a significant improvement in the ORR performance.

Figures 1, 2:
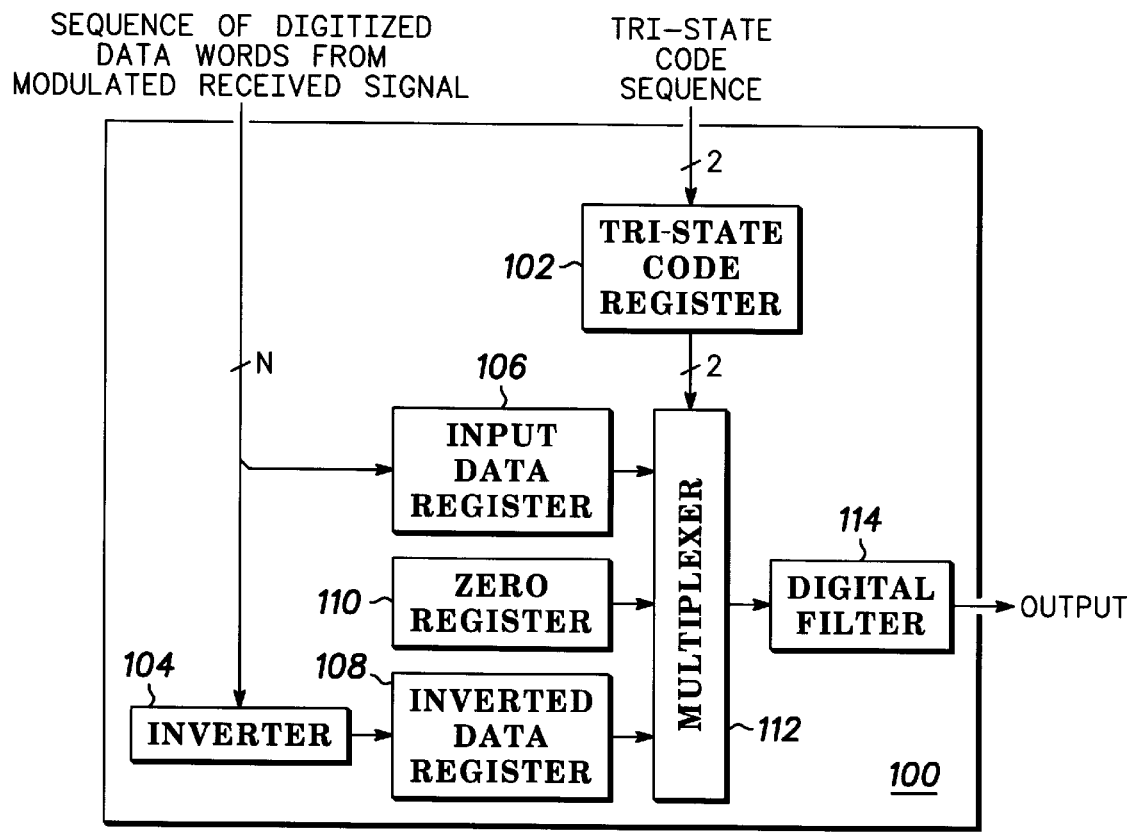
FIG. 1 is a block diagram illustrating a tri-state correlator in accordance with the present invention.
FIG. 2 is a table illustrating a multiplexer of the tri-state correlator mappings between the data inputs and the data output as a function of a tri-state code input.

Referring now to FIG. 1, an embodiment of a tri-state digital correlator 100 in block diagram form is shown. Synchronization is provided by any of several means well known to the art to ensure that at discrete instances of time, the tri-state code register 102 stores the current state in a sequence of tri-state code states, and that likewise the input data register 106 stores the current data word in a sequence of data words and that the inverted data register 108 stores the current inverted data word in a sequence of inverted data words. Once latched, exactly one of the three tri-state code states, defined herein as the +1 state, the −1 state, and the 0 state, is included in the tri-state code register 102. Once latched, the input data register 106 includes a digital data word having at least two bits obtained by digitizing a biphase modulated received signal such as, for example, by using an analog to digital converter. Once latched, the inverted data register 108 contains a digital data word which has a numerical value equal to the negative of the numerical value of the digital data word included in the input data register 106. The function of the inverter 104 is to negate the numerical value of the digital data word appearing at its input and to present this negated value at its output. The zero register 110 includes a digital data word having at least one bit which has a constant numerical value of zero. Preferably, input data register 106, the inverted data register 108, and the zero register each represent the values included therein using the same number of bits.

The multiplexer 112 shown in FIG. 1 has three input registers for receiving the outputs of the input data register 106, the inverted data register 108, and the zero register 110. The contents of exactly one of these three input registers is presented at the multiplexer 112 output depending on which of the three possible tri-state code states is presently included in the tri-state code register 102. Synchronization well known to the art is provided to transfer the contents of the input register selected by the tri-state code state at a discrete instance of time when the contents of the three input registers and of the tri-state code register are safely latched.

The digital filter 114, shown in FIG. 1, filters the signal at the output of the multiplexer 112. Preferably, this is a low pass filter having a narrow pass band relative to the bandwidth of the digitized biphase modulated received signal, but wide enough to pass the narrower bandwidth of the information content of the received signal. This technique of spreading the bandwidth of the transmitted waveform by means of a wide band PN code and subsequently narrow band filtering the received signal after demodulation is well known to the art for spread spectrum systems to which this invention applies. The many variations of implementing this digital filter know to the art are within the scope when taken in combination with other elements of the invention. For example, a narrow bandpass filter is often used to accomplish similar results and in particular, the filter function is often accomplished by means of a simple accumulator also well known to the art.

Each data word in the sequence of digitized data words from the biphase modulated received signal which is input to the input data register 106 and the inverter 104, may be either real or complex (comprising both a real and an imaginary part). If these data words are complex, then it is understood by a person of ordinary skill in the art that the inverter 104, the input data register 106, the inverted data register 108, the multiplexer 112, and the digital filter 114 all must accommodate a real and an imaginary part.

FIG. 2 shows a table defining the mapping between the three multiplexer 112 input data registers 106, 108, 110, and the multiplexer 112 output as a function of the contents of the tri-state code register 102. Due to the symmetry of the tri-state code sequence, there are possible variations of the multiplexer mapping which those having ordinary skill in the art will recognize as producing equivalent results. Two such multiplexer mappings are given in FIG. 2. In the preferred multiplexer mapping, the contents of the input data register 106 is presented at the multiplexer 112 output when the +1 state is included in the tri-state code register 102, the contents of the inverted data register 108 is presented at the multiplexer 112 output when the −1 state is included in the tri-state code register 102, and the contents of the zero register 110 is presented at the multiplexer 112 output when the 0 state is included in the tri-state code register 102. In the alternate multiplexer mapping also shown in FIG. 2, the contents of the inverted data register 108 is presented at the multiplexer 112 output when the +1 state is included in the tri-state code register 102, the contents of the input data register 106 is presented at the multiplexer 112 output when the −1 state is included in the tri-state code register 102, and the contents of the zero register 110 is presented at the multiplexer 112 output when the 0 state is included in the tri-state code register 102.

The tri-state code sequence used to demodulate the biphase modulated received signal is derived from the PN binary code sequence used to generate the transmitted biphase modulated waveform. An understanding of the derivation of the tri-state code sequence is essential to understanding how significant improvement in autocorrelation performance is achieved. More specifically, the tri-state code sequence is derived from the PN binary code sequence used to generate the transmitted biphase modulated waveform and from a delayed version of the same PN binary code sequence as shown in FIGS. 3 and 10–12. The amount of delay between the binary code state and the delayed binary code state used to derive the tri-state code sequence depends on the application. Subsequently, the resulting tri-state code sequence may also be delayed by the receiver to select a desired correlated range. Preferably, the amount of this delay used to derive the tri-state code sequence is an integer number of chip widths of the PN binary code sequence. In a preferred embodiment of either a communications system or a radar system, the amount of delay used to derive the tri-state code sequence is one chip width of the PN code sequence to achieve 50% overlap of adjacent range correlation bins. In another embodiment of interest, the amount of delay used to derive the tri-state code sequence is approximately one half the PN code length to achieve approximately equal spacing between correlated ranges. As another example, for a radar system wherein the range to targets of interest is dose relative to the ambiguous range of the periodic PN binary code sequence, the amount of delay used to derive the tri-state code sequence may be set to a small integer which is greater than the number of target range gates.

Figure 3:
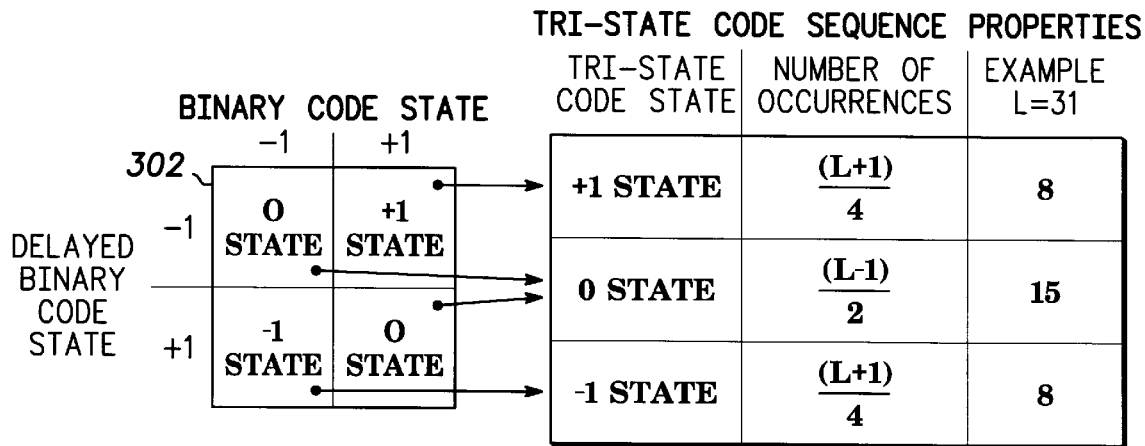

As shown in Table 302 of FIG. 3, a binary code state of −1 concurrent with a delayed binary code state of −1 maps to a 0 state for the tri-state code sequence. Similarly, a binary code state of +1 concurrent with a delayed binary code state of +1 also maps to a 0 state for the tri-state code sequence. Further, a binary code state of −1 concurrent with a delayed binary code state of +1 maps to a −1 state for the tri-state code sequence, and a binary code state of +1 concurrent with a delayed binary code state of −1 maps to a +1 state for the tri-state code sequence. Again, due to the symmetry of the derived tri-state code sequence, there are variations to this table which those having ordinary skill in the art will recognize as producing equivalent results. For example, reversing the role of the binary code state and the delayed binary code state produces an equivalent result.

The three waveforms 304, 306, 308 shown in FIGS. 10–12, respectively, illustrate the creation of an example tri-state code sequence 308 from an example binary code sequence 304 and an example delayed binary code sequence 306. In this example, the binary code sequence 304 used to create the tri-state code sequence has a code length, L, equal to 31.

The purpose of generating this tri-state code sequence is to obtain a significant improvement in the out of range rejection (ORR) performance relative to what would be obtained with a conventional binary code sequence. To implement the present invention, it is helpful to understand the nature of the ORR performance improvement.

A well-known property of maximal length code sequences is that the number of occurrences of each of the two binary code states over the length of the code differs by exactly 1. An arbitrary convention used here to explain the present invention is to define the −1 binary code state as the binary code state which occurs in $(L-1)/2$ of L instances over the code length L, and to define the +1 binary code state as the binary code state which occurs in $(L+1)/2$ of L instances. For an example code length of L=31 following this convention, a −1 binary code state occurs a total of 15 times and a +1 binary code state code state occurs a total of 16 times for the 31 total instances over the duration of a complete binary code sequence as illustrated by the example binary code sequence 304. For the example delayed binary code sequence 306, the −1 binary code state and the +1 binary code state also occur a total of 15 and 16 times respectively over the duration of a complete binary code sequence.

Referring again to FIG. 3, Table 310 illustrates properties of the tri-state code sequence important to understanding the present invention. Following the convention used for defining the binary code states in Table 302, the properties of the tri-state code sequence as defined by Table 302 are also such that over a code length, L, a +1 tri-state code state occurs in $(L+1)/4$ of the L instances, a −1 tri-state code state also occurs in $(L+1)/4$ of the L instances, and a 0 tri-state code state occurs in $(L-1)/2$ of the L instances as shown in Table 310. This property is true regardless of the relative delay between binary code sequence and the delayed binary code sequence used to generate the tri-state code sequence as in Table 302. This assumes that the relative delay is not zero or an integer multiple of the code length which is ambiguously equivalent to zero delay, in that such trivial delays are not allowed for generating a valid tri-state code sequence. For an example tri-state code sequence of length L=31 Table 304, the example tri-state code sequence 308, a +1 tri-state code state occurs 8 times, a −1 tri-state code state occurs 8 times, and a 0 tri-state code state occurs 15 times over the duration of a complete tri-state code sequence. Of significance to understanding the present invention is that the 0 tri-state code state occurs an odd number of times, and that the number of occurrences of the +1 tri-state code state and of the −1 tri-state code state are equal.

Demodulation may be performed on the received signal using either analog or digital circuitry. Analog demodulation may be performed by a biphase modulator in the receive path designed to apply one of the following three conditions depending on the state of the tri-state code sequence: 1) 0 degrees of phase shift reference, 2) 180 degrees of phase shift relative to reference, or 3) zero output, in response to the +1, −1, and 0 tri-state code states respectively. Analog demodulation may also be performed at baseband using an amplitude demodulator which may scale and multiply the baseband signal by the value of the tri-state code state.

FIGS. 4 and 12–14 illustrate the range correlation process when a digital tri-state correlator 100 such as shown in FIG. 1 is used to range correlate a biphase modulated receive signal which has an undesired range delay. The conventions defined for FIG. 3 are also assumed for FIG. 4. A convention further arbitrarily defined for purposes of teaching the present invention is that a biphase modulator existing in a transmit path affects a reference 0 degrees of phase shift in response to the +1 binary code state which occurs in $(L+1)/2$ of the total L instances over the code length, and effects 180 degrees of phase shift relative to the reference in response to the −1 binary code state which occurs in $(L-1)/2$ of total L instances. Following this convention, the biphase modulated receive signal shown at the top of table 402 will also have a 180 degree relative phase shift for $(L-1)/2$ instances of the code sequence of length L, and will have a 0 degree relative phase shift for $(L+1)/2$ instances of the code sequence of length L. An example biphase modulated received signal 412 is shown for a binary code sequence of length, L=31. The three possible input conditions of the tri-state code sequence are shown to the left of table 402. The number of occurrences of each tri-state code state of the total L taken over a complete code length is as was previously shown in table 310 of FIG. 3. An example tri-state code sequence 308 has already been shown in FIG. 12.

The entries of table 402 give the output of multiplexer 112 as either in-phase, out-of-phase, or zero. As shown, two input situations result in a multiplexer 112 output which is in-phase with a phase reference including: 1) the relative phase shift of the biphase modulated received signal is 180 degrees concurrent with a −1 tri-state code state which occurs in $(L+1)/8$ of the total L instances, and 2) the relative phase shift of the biphase modulated received signal is 0 degrees concurrent with a +1 tri-state code state which also occurs in $(L+1)/8$ of the total L instances. Similarly, two input situations result in a multiplexer 112 output which is out-of-phase with a phase reference including: 1) the relative phase shift of the biphase modulated received signal is 0 degrees concurrent with a −1 tri-state code state which again occurs in $(L+1)/8$ of the total L instances, and 2) the relative phase shift of the biphase modulated received signal is 180 degrees concurrent with a +1 tri-state code state which also occurs in $(L+1)/8$ of the total L instances. The multiplexer 112 output is zero whenever the state of the tri-state code sequence is zero including two input situations: 1) the relative phase shift of the biphase modulated received signal is 180 degrees concurrent with a 0 tri-state code state which occurs in $(L-3)/4$ of the total L instances, and 2) the relative phase shift of the biphase modulated received signal is 0 degrees concurrent with a 0 tri-state code state which occurs in (L+1)/4 of the total L instances. As shown in table 404, the output of multiplexer 112 is in-phase with the phase reference a total of (L+1)/4 of the total L instances, is out-of-phase with the phase reference also a total of (L+1)/4 of the total L instances, and is zero a total of (L−1)/2 of the total L instances. Note again that the output of the multiplexer is in-phase with the phase reference as often as it is out-of-phase and that is zero for an odd number of occurrences when the received signal has an undesired range delay.

Table 404 shows that for an example tri-state code sequence of length L=31 and for a received signal having an undesired range delay, the output of multiplexer 112 is in-phase with the phase reference for 8 of the total 31 instances, is out-of-phase with the phase reference also for of 8 of the total 31 instances, and is zero for of 15 of the total 31 instances. An example multiplexer 112 output for a tri-state code sequence of length L=31 and an undesired range delay is illustrated in FIG. 14 by waveform 414. The example multiplexer output waveform 414 is obtained by applying the multiplexer mapping of Table 402 when the example biphase modulated received signal is as shown in FIG. 13 and the example tri-state code sequence is as shown in FIG. 12.

The observation that the number of occurrences of the in-phase condition and the out-of-phase condition is always equal, and that the number of occurrences associated with the zero condition is always odd, is of significance in realizing the improved ORR when this invention is implemented. The example multiplexer output 414 can be visualized to be low pass filtered. Since this signal is in-phase as often as out-of-phase, the residual result of low pass filtering is theoretically zero. Consequently, the ORR performance is theoretically perfect. Conversely, the example biphase modulated received signal 412 (of FIG. 13) is also essentially an example of a representative waveform after range correlation in a conventional PN system using a binary code sequence for receive signal having an undesired range delay. Here, the signal is in-phase more often than it is out-of-phase by exactly 1 of a total L instances. If this waveform were low pass filtered as in a conventional PN system, a residual sine wave would be present at the filter output which is rejected by 20 log($^1$/L) dB which is a well-known theoretical limit to the ORR achieved in a conventional PN system. This invention thus provides significant improvement in the ORR relative to conventional PN systems currently in wide use.

Figure 4:
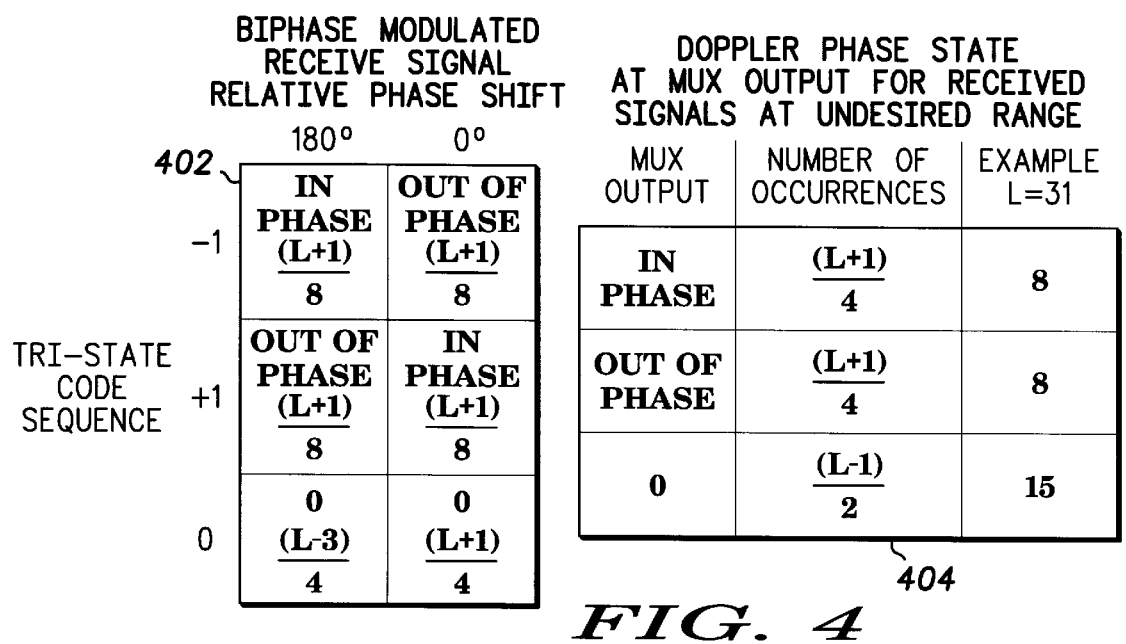
Figure 5:
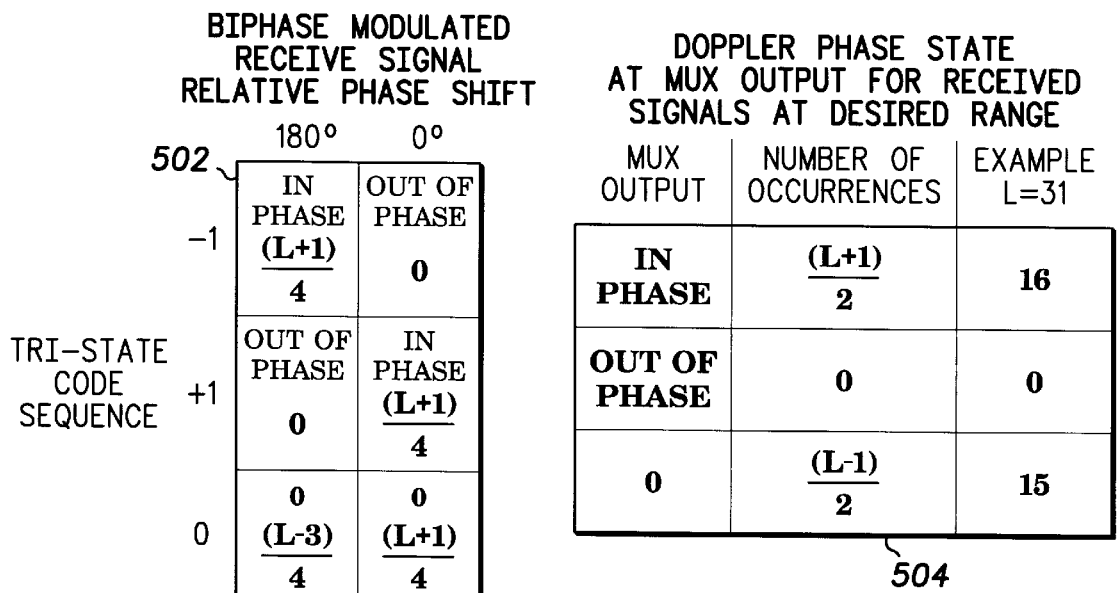

For completeness, FIGS. 5 and 12, 15 and 16 illustrate the range correlation process when a digital tri-state correlator 100 such as shown in FIG. 1 is used to range correlate a biphase modulated receive signal which has an desired range delay. The conventions defined for FIG. 4 are also assumed for FIG. 5. An example tri-state code sequence 308 is also shown in FIG. 12. The entries of table 502 show that for a biphase modulated received signal having a desired range delay the output of multiplexer 112 as either in-phase, or zero. As shown, two input situations result in a multiplexer 112 output which is in-phase with a phase reference including: 1) the relative phase shift of the biphase modulated received signal is 180 degrees concurrent with a −1 tri-state code state which occurs in (L+1)/4 of the total L instances, and 2) the relative phase shift of the biphase modulated received signal is 0 degrees concurrent with a +1 tri-state code state which also occurs in (L+1)/4 of the total L instances. The multiplexer 112 output is zero whenever the state of the tri-state code sequence is zero including two input situations: 1) the relative phase shift of the biphase modulated received signal is 180 degrees concurrent with a 0 tri-state code state which occurs in (L−3)/4 of the total L instances, and 2) the relative phase shift of the biphase modulated received signal is 0 degrees concurrent with a 0 tri-state code state which occurs in (L+1)/4 of the total L instances. Neither of the two input situations which would result in a multiplexer 112 output which is out-of-phase with a phase reference including: 1) the relative phase shift of the biphase modulated received signal is 0 degrees concurrent with a −1 tri-state code state and 2) the relative phase shift of the biphase modulated received signal is 180 degrees concurrent with a +1 tri-state code state, occur when the biphase modulated received signal has a desired range delay. As shown in table 504, the output of multiplexer 112 is in-phase with the phase reference a total of (L+1)/2 of the total L instances, is zero a total of (L−1)/2 of the total L instances, and is out-of-phase with the phase reference also a total 0 of the total L instances.

Table 504 shows that for an example tri-state code sequence of length L=31 and for a received signal having a desired range delay, the output of multiplexer 112 is in-phase with the phase reference for of 16 of the total 31 instances, is zero for of 15 of the total 31 instances, and is out-of-phase with the phase reference also for of 0 of the total 31 instances. An example multiplexer 112 output for a tri-state code sequence of length L=31 and an undesired range delay is illustrated in FIG. 16 by waveform 514. The example multiplexer output waveform 514 is obtained by applying the multiplexer mapping of Table 502 when the example biphase modulated received signal is as shown in FIG. 15 and the example tri-state code sequence is as shown in FIG.12.

This example multiplexer output 514 can be visualized to be low pass filtered. Since this signal is never out-of-phase, the residual result of low pass filtering a sine wave resulting is good correlation as desired for a biphase modulated received signal having a desired range delay.

Figure 6:
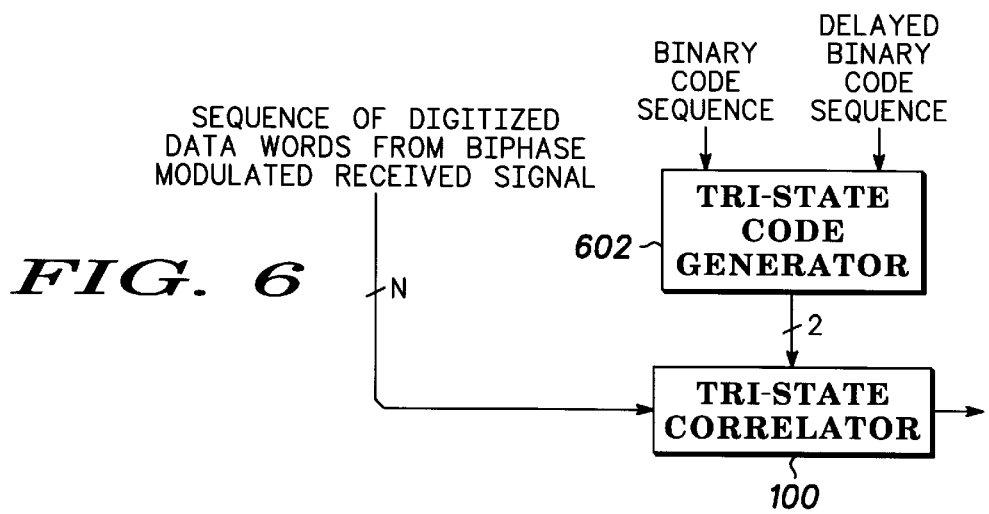
FIG. 6 is a block diagram illustrating the tri-state correlator of FIG. 1 for use in generating a tri-state code sequence in real-time.

The tri-state code sequence input to the tri-state code register 102 may be predetermined using the table of FIG. 3 and stored in memory for later retrieval. Preferably, the tri-state code sequence is generated in real time using logic circuitry well known to the art. FIG. 6 shows an embodiment of the present invention in which a tri-state code generator 602 is used to generate a tri-state code sequence in real time. As shown, the tri-state code generator 602 has two inputs including a binary code input for receiving a binary code sequence, and a delayed binary code input for receiving a delayed code sequence. In this embodiment, logic circuitry within the tri-state code generator converts the two input binary sequences into a tri-state code sequence according to the table of FIG. 3, which is presented at the output. In a preferred embodiment, two bits at the output of the tri-state code generator 602 are required to encode the tri-state code sequence into one of the three possible states. The output of the tri-state code generator 602 is coupled to the tri-state correlator 100 which includes the elements shown in FIG. 1. In this preferred embodiment, the tri-state code register 102 includes two bits to store the current tri-state code state.

Figure 7:
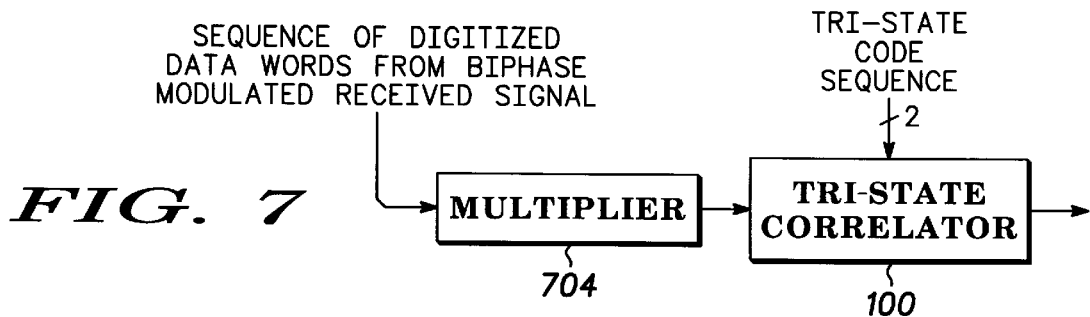
FIG. 7 is a block diagram illustrating a multiplier for use with the tri-state correlator of FIG. 1 for pre-multiplying the sequence of data prior to being input to the tri-state correlator.

FIG. 7 shows an embodiment of the present invention in which a multiplier 704 element is included to premultiply the sequence of digitized data words from the biphase modulated received signal prior to being presented as input to the tri-state correlator 100 of FIG. 1. The operation of multiplier 704 is described in detail in allowed U.S. patent application having Ser. No. 08/593,103, filed on Jan. 30, 1996, and assigned to the assignee of the present invention (the '103 Patent Application), the subject matter of which is incorporated by reference herein. Briefly, multiplier 704 multiplies two digitized data words, each in a sequence of digitized data words, to produce a sequence of data words at the multiplier 704 output. These two sequences of data words include the sequence of digitized data words form the biphase modulated received signal as introduced in FIG. 1, and a sequence of precomputed data words which have been stored in memory. In a preferred embodiment, the precomputed data words are complex, having a real and imaginary part, and the digitized data words from the biphase modulated received signal may be either real or complex. The data words at the output of the multiplier 704 are thus complex having real and imaginary parts. In this preferred embodiment, the real and imaginary parts of the precomputed data words are windowed sine waves in phase quadrature forming a discrete Fourier transform kernel vector. However, many other kernel vector types could also be used. The output of the multiplier 704 is coupled to the data input of the tri-state correlator 100 which contains the elements shown in FIG. 1. In this embodiment, the digital filter 114 is an accumulator. As taught in '103 Patent Application, the accumulator simultaneously completes both the range correlation process initiated in the multiplexer 112 and the spectral processing initiated in the multiplier 704.

Figure 8:
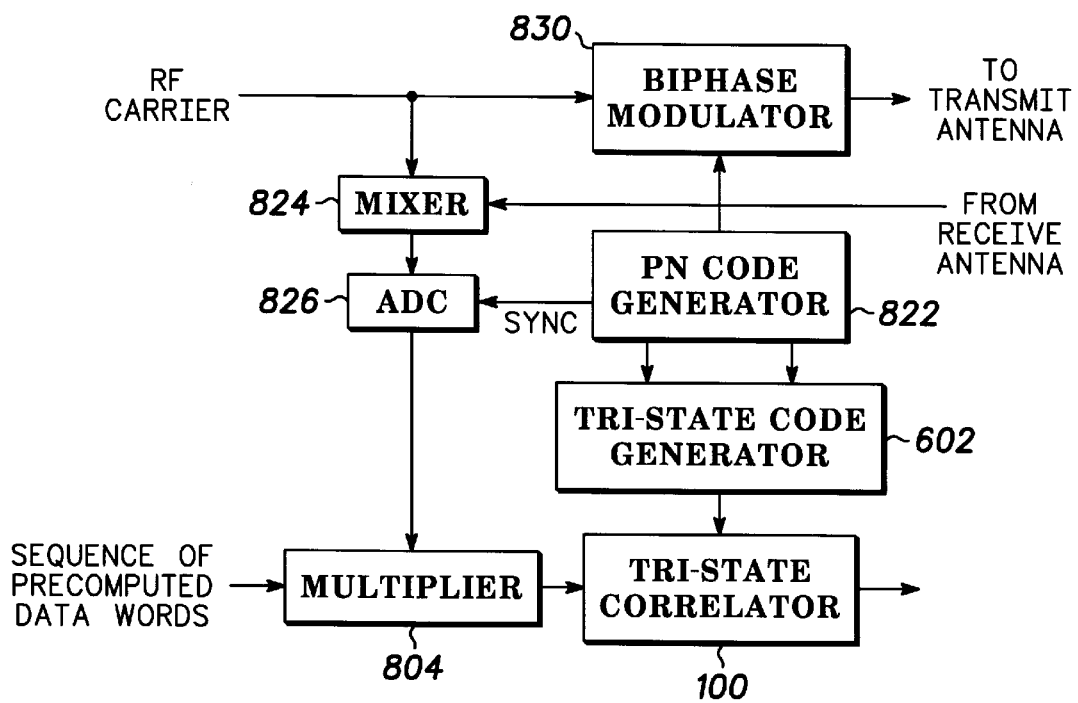
FIG. 8 is a block diagram illustrating a spread spectrum radar system incorporating the tri-state correlator of FIG. 1.

FIG. 8 shows an example of a spread spectrum radar system in which the present invention is embodied. Biphase modulator 830 is used to biphase modulate an RF carrier thereby spreading the spectrum from a single spectral line at the RF carrier frequency to a wide bandwidth signal having characteristics of the maximal length PN code sequence. This biphase modulated signal is sent to the transmit antenna where it is transmitted into free space. This signal is reflected from a target and/or clutter which imparts Doppler information by virtue of the relative motion between the target and the radar system. This Doppler encoded return signal is received by the receive antenna which is coupled to mixer 824 where it is down converted to baseband. The baseband signal at the output of mixer 824 is digitized by analog to digital converter (ADC) 826. The sample rate of ADC 824 is synchronized to the bit rate of the PN code such that an integer number of A to D samples are taken for each bit of the PN code, preferably one sample per bit.

PN code generator 822 generates a maximal length PN binary code sequence well known to the art. This PN code sequence is received by biphase modulator 830 which imparts either a zero degree or 180 degree phase shift depending on the current PN code state. Two additional PN binary code sequences are generated by PN code generator 822 which are received by tri-state code generator 602 as was discussed with reference to FIG. 6. These two additional PN binary code sequences are delayed relative to the code sequence sent to biphase modulator 830 and are also delayed relative to each other. The delay of the two additional PN binary code sequences relative to the PN binary code sequence received by biphase modulator 830 determines the range at which target return will correlate. The target return will correlate for the target range associated with the delays of both of the two additional PN binary code sequences. That is, targets positioned in range at either of the two range delays will correlate. These two additional PN binary code sequences are received by tri-state code generator 602 for generating a tri-state code sequence as explained with FIG. 6 thereby obtaining a significant improvement in the out of range rejection performance.

Multiplier 704 produces the product of the current digitized data word at the output of ADC 826 and the current precomputed data word as discussed with FIG. 7. The indusion of the multiplier 704 element is an optional variation of the present invention. Tri-state correlator 100 receives a sequence of data words preferably from the output of multiplier 704 (or optionally from the output of ADC 826). Tri-state correlator 100 also receives a sequence of tri-state code states from tri-state code generator 602 and periodically, produces a digital output word as discussed with FIG. 1.

FIG. 9 shows an example of a spread spectrum communications system in which the present invention is embodied. Narrow band data information is encoded onto a broad band biphase modulated transmit signal by one of several means known to the art. In the embodiment shown, data modulator 934 modulates narrow band data onto an RF carrier. The output of the data modulator is coupled to the RF input of biphase modulator 930. PN code generator 932 is also coupled to biphase modulator 930 which modulates the wide bandwidth PN code spectrum onto the narrow bandwidth data modulated RF carrier, thereby spreading the spectrum. There are many variations well known to the art for modulating narrow bandwidth data onto a wide bandwidth PN coded spectrum to achieve equivalent results. For example, the RF carrier is often input directly into biphase modulator 930 and the narrow bandwidth data is modulated directly onto the wide bandwidth PN coded waveform. This data modulated PN coded waveform may then be used to biphase modulate the RF carrier. Persons of ordinary skill in the art will recognize that these variations apply to the present invention.

The spread spectrum waveform containing narrow bandwidth data information as well as the wide bandwidth characteristics of the PN coded waveform are sent to transmit antenna 938 where it is sent over wireless link to receive antenna 928 of a remotely located receiver. Mixer 924 receives the received biphase modulated signal at the output of receive antenna 928 and also receives an RF carrier frequency which is typically at the same frequency as the RF carrier at the input of data modulator 934 in the transmitter. Mixer 934 thus down converts the biphase modulated received signal to baseband.

The operation of the remaining elements of the spread spectrum communications receiver FIG. 9 pertaining to the present invention are very similar to the elements of the receiver portion of the spread spectrum radar FIG. 6. The baseband signal at the output of mixer 924 is digitized by analog to digital converter (ADC) 826. The sample rate of ADC 924 is synchronized to the bit rate of the PN code such that an integer number of A to D samples are taken for each bit of the PN code, preferably one sample per bit.

The PN code generator 922 in the receiver generates a maximal length PN binary code sequence well known to the art. This PN code sequence in the receiver is the same as that produced by PN code generator 932 in the transmitter. Two PN binary code sequences are generated by PN code generator 922 which are received by tri-state code generator 602. These two PN binary code sequences are delayed relative to the code sequence sent to biphase modulator 930 in the transmitter and are also delayed relative to each other. The delay of the two PN binary code sequences relative to the PN binary code sequence received by biphase modulator 930 determines the range separation between the transmitter and receiver at which the received signal will correlate so that the data information can be extracted. The received signal will correlate for the range separation associated with the delays of both of the two PN binary code sequences. That is, a separation distance between transmitter and receiver of either of the two range separation delays will correlate.

These two PN binary code sequences are received by tri-state code generator 602 which generates a tri-state code sequence as explained with FIG. 6. The purpose of generating this tri-state code sequence is to obtain a significant improvement in the out of range rejection (ORR) performance relative to what would be obtained with a conventional binary code sequence.

Multiplier 704 produces the product of the current digitized data word at the output of ADC 826 and the current precomputed data word as discussed with FIG. 7. The inclusion of the multiplier 704 element is an optional variation of the present invention. Tri-state correlator 100 receives a sequence of data words preferably from the output of multiplier 704 (or optionally from the output of ADC 826). Tri-state correlator 100 also receives a sequence of tri-state code states from tri-state code generator 602 and periodically, produces a digital output word as discussed with FIG. 1. The output of tri-state correlator 100 is coupled to a data demodulator 918 which extracts the data information which appears at its output.

While a preferred embodiment of the present invention is described, it is contemplated that various modifications may be made thereto without departing from the spirit and scope of the present invention. Accordingly, it is intended that the embodiments described be considered only as illustrative of the invention and that the scope of the invention be determined by the claims hereinafter provided.

I claim:

1. A tri-state correlator, responsive to a sequence of data words, for correlating a biphase modulated signal, comprising:

a multiplexer having a control input responsive to a sequence of tri-state code words each having one of three distinct states, said multiplexer also having first, second and third inputs respectively responsive to said sequence of data words, an inversion of said sequence of data words, and a zero data word, said multiplexer having an output for providing a sequence of multiplexer output words based upon the state of said tri-state code words appearing at said control input; and a filter for filtering said multiplexer output words.

2. The tri-state correlator of claim 1 further including an inverter, responsive to said sequence of data words, for providing said inversion of said sequence of data words.

3. The tri-state correlator of claim 1 further including data registers for storing said sequence of data words, said inversion of said sequence of data words, and said zero data word.

4. The tri-state correlator of claim 1 wherein said three distinct states of said tri-state code words are +1, −1 and 0.

5. The tri-state correlator of claim 1 wherein said filter is an accumulator.

6. The tri-state correlator of claim 1 wherein each of the data words includes a real part.

7. The tri-state correlator of claim 1 further including a multiplier for premultiplying said sequence of data words.

8. A method for correlating a biphase modulated signal, the method comprising the steps of:

receiving tri-state codes having one of three distinct states;

receiving a sequence of data;

inverting said sequence of data;

providing a sequence of zeroes;

selectively providing, at an output, said sequence of data, said inverted data or said sequence of zeroes based upon an occurrence of one of said three distinct states of said received tri-state code.

9. The method of claim 8 further including the step of filtering data appearing at said output.

10. The method of claim 8 wherein said three distinct states of said tri-state code words are +1, −1 and 0.

11. The method of claim 8 wherein said sequence of data is provided when said received tri-state code is +1, said inverted sequence of data is provided when said received tri-state code is −1, and said sequence of zeroes is provided when said received tri-state code is 0.

12. The method of claim 8 wherein said sequence of data is provided when said received tri-state code is −1, said inverted sequence of data is provided when said received tri-state code is +1, and said sequence of zeroes is provided when said received tri-state code is 0.

13. The method of claim 8 further including the steps of premultiplying said sequence of data.

14. A receiver for receiving a pseudorandom noise (PN) biphase modulated RF signal, comprising:

a mixer for downconverting said PN biphase modulated RF signal to a baseband signal;

an analog-to-digital converter for digitizing said baseband signal into a sequence of data words;

a tri-state correlator for correlating said sequence of data words with PN binary code sequences, said tri-state correlator including:

a tri-state code generator, responsive to said PN binary code sequences, for generating tri-state codes each having one of three distinct states;

a multiplexer having a control input responsive to said tri-state codes, said multiplexer also having first, second and third inputs respectively responsive to said sequence of data words, an inversion of said sequence of data words, and a zero data word, said multiplexer having an output for providing a sequence of multiplexer output words based upon the state of said tri-state code words appearing at said control input; and a digital filter for filtering said multiplexer output words.

15. The receiver of claim 14 wherein said PN binary code sequences are delayed relative to a PN binary code sequence used to generate said PN biphase modulated RP signal.

16. The receiver of claim 14 wherein said three distinct states of said tri-state code words are +1, −1 and 0.

17. The receiver of claim 16 wherein said sequence of data words appears at said output of said multiplexer when said tri-state code is a +1, said inverted sequence of data words appears at said output of said multiplexer when said tri-state code is a −1, and said zero data word appears at said output of said multiplexer when said tri-state code is a 0.

18. The receiver of claim 16 wherein said sequence of data words appears at said output of said multiplexer when said tri-state code is a −1, said inverted sequence of data words appears at said output of said multiplexer when said tri-state code is a +1, and said zero data word appears at said output of said multiplexer when said tri-state code is a 0.

* * * * *